United States Patent [19]
Leonard

[11] 3,921,493
[45] Nov. 25, 1975

[54] KEYBOARD CHORD AND RHYTHM COORDINATOR

[76] Inventor: Verna M. Leonard, 8701 Highway 41, Fresno, Calif. 93705

[22] Filed: Jan. 29, 1975

[21] Appl. No.: 545,208

[52] U.S. Cl. .................................................. 84/474
[51] Int. Cl.² ......................................... G09B 15/02
[58] Field of Search ............................... 84/470–485

[56] References Cited
UNITED STATES PATENTS

| | | | |
|---|---|---|---|
| 741,017 | 10/1903 | Curtiss | 84/480 |
| 979,193 | 12/1910 | Nelson | 84/473 |
| 2,944,349 | 7/1960 | Kaufman | 84/470 X |
| 3,245,303 | 4/1966 | Patt | 84/485 |

*Primary Examiner*—Lawrence R. Franklin
*Attorney, Agent, or Firm*—Ralph S. Branscomb

[57] ABSTRACT

The invention is a music training aid for developing the piano student's left and right hand coordination and rhythm without confusing the learning process with the prematurely introduced complications of note reading and tone length. The device has a stiff planar base or backing on which are mounted a plurality of hinged panels, each of which relates to a particular key signature and has a display of piano keyboard along its upper border. The keys of each keyboard display which fall into the indicated key signature are identified by letter names, with the extraneous keys being unnamed and several chord cards are slideable in a track behind the keyboard displays and have spaced arrows thereon indicating the notes on the keyboard which are used in a particular chord type. The lower portions of the panels have indicia representing base and treble clef measures which are filled in by the student with the letter names of the scale tones of the chords which he has selected with the cards, and pivoted strips indicating different time signatures and meter signatures are extensible between the bass and treble measures to establish the rhythm the student uses while playing with both hands the notes he has named in the measure spaces.

7 Claims, 3 Drawing Figures

KEYBOARD CHORD AND RHYTHM COORDINATOR

BACKGROUND OF THE INVENTION

It is easy to read music and count the values of quarter notes, eighth notes, and dotted notes, etc., with either the right or left hand alone, but combining the two hands to play a different time sequence with each is one of the most difficult skills to be acquired by the piano student and mentally involves the beginner in tedious deliberations regarding time and rhythm for one hand while the other deviates from the score. Development of the sophisticated muscular coordination required to operate the two hands independently according to the relatively unrelated bass and treble scores is thwarted by conventional teaching techniques in which the different note lengths and different notes on the musical score from which the student is practicing must be grappled with and absorbed simultaneously, resulting in overwhelming the student and causing his learning progress to be sluggish.

SUMMARY OF THE INVENTION

The present invention is intended to be used with or without supplemental instruction to overcome the abovementioned coordination assimilation blocks by providing a training aid which permits the student to concentrate solely on the rhythm and timing coordination problem without involving the need to simultaneously practice note reading and note length recognition and execution. The student plays according to the letter names of the keys rather than written notes and all notes are of even value, so that although one hand may play a note while the other is on a rest, all notes or rests occur on the beat or in even time.

Structurally the invention is based on a card or panel which is identified with a particular key signature and has a representation of a piano keyboard along the upper border with the keys on the keyboard which occur in the identified key signature bearing their letter names, the others of the keys being blank. Chords or scales in the key signature are selected by manipulating planar insert cards which slide behind the keyboard representation and indicate the scale tones of a particular chord type, and the individual scale tones constituting these chords are written in marked treble and bass writing spaces divided into measures which are provided on the panel beneath the keyboard.

DETAILED DESCRIPTION OF THE PREFERRED EMBODIMENT

Figure 1:
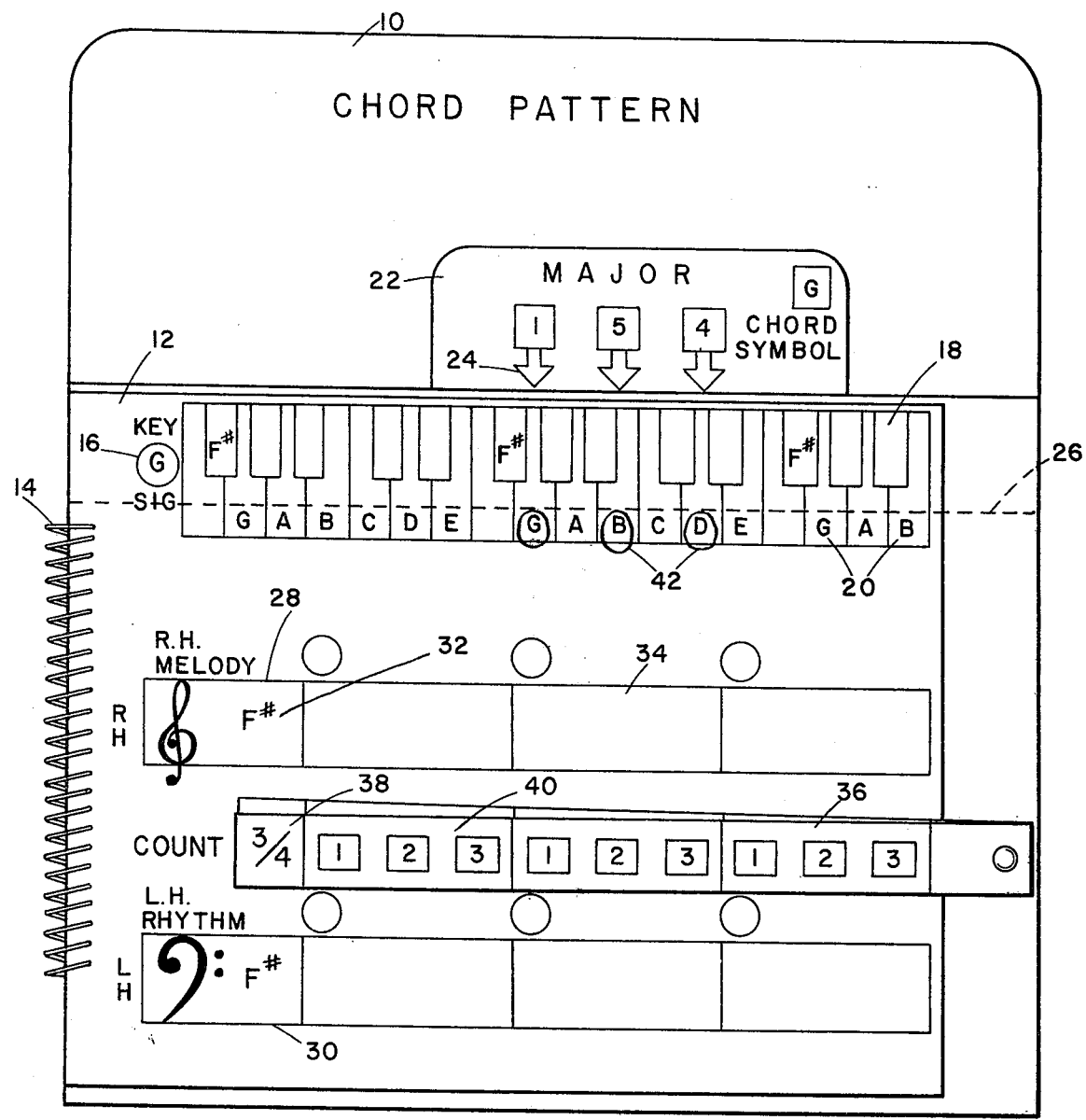
FIG. 1 is a front elevation view of the invention.

The invention comprises a planar backing or base member 10, which is most economically constructed of stiff paper or plastic. A plurality of selectively exposable panels 12 are mounted to the base member such as by spiral binding 14, or other suitable means such as rubber-base binding or the provision of a shallow pocket on the base to receive the panels. When the panels are in overlying relationship as shown in FIG. 1, the upper edges are roughly coincident.

Each panel is arranged around a single key signature as indicated at 16, and the different panels should represent different key signatures so that all twelve are included. A representation 18 of a piano keyboard is displayed along the upper border of each panel, and the keys of the keyboard which are used in the particular key signature of the respective panel are named at 20, with the keys incidental to the key signature being unnamed so that the pertinent keyboard keys may be ascertained at a glance.

Figure 2:
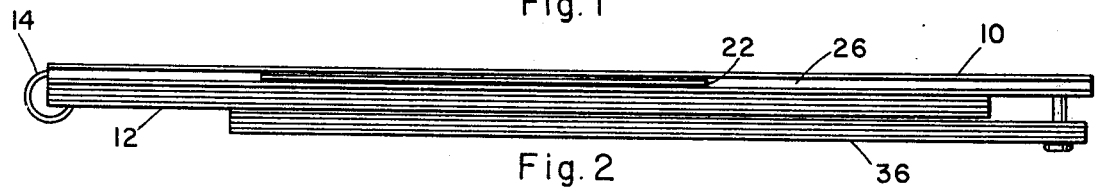
FIG. 2 is a view looking down on the invention from the top as oriented in FIG. 1.
Figure 3:
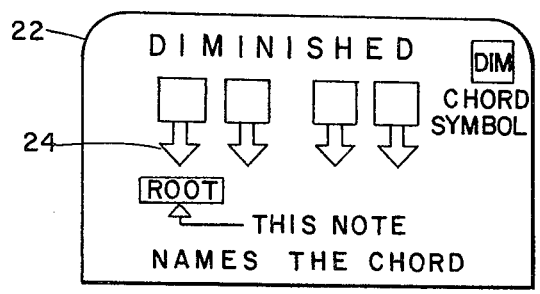
FIG. 3 is a front elevation view of an additional type of chord card.

One or more chord cards 22 are provided, each of which names a particular chord type or scale and has indicator arrows 24 which register with the keys on the keyboard that are played in the named chord type or scale. These cards are laterally slideable along the panel tops so that a particular chord may be picked in any keys signature by proper sliding adjustment. The cards are preferably printed with different chord or scale types on each side, the reverse side of a chord being shown in FIG. 2.

Some means must be provided to maintain the chord cards in sliding juxtaposition with the keyboards, and in the illustrated embodiment a track 26 mounted to the base 10 is used, although these cards could be provided as riders on the panels themselves or other suitable alternative track structure could be incorporated in the device.

Each of the panels has a treble staff 28 and a bass staff 30 having the incidentals 32 of the key signature marked thereon and divided into the usual measure spaced 34 and having the incidentals 32 of the key signature displayed in the appropriate positions, but both staffs are devoid of the staff lines necessary for note reading and writing. The totality of the measure spaces are representative of different circumscribed writing spaces that could be used to accomplish the same purpose as the illustrated configuration but slightly differently arranged.

There is nothing on the panels 12 to indicate time signature, so in fact each panel could be used with any desired time signature. To remove this ambiguity, strips 36 are pivoted to the base 10 such that they may individually be swung out between the base and treble staffs each of the strips identifying a different time signature 38 and being divided into measure spaces 34. In each of these measure spaces is displayed the even time count, or "meter signature", corresponding to the time signature identified on the strip.

The operation of the device as thus described is as follows. First the student selects the particular one of the panels 12 representing the key signature he wishes to practice in, and then a time signature strip is chosen. The third option avaliable is the chord types or scales of the chord cards 22 that will be used which is determined and then executed by adjusting the cards along the keyboard representation until the keys of the chord or scale correctly register with the indicators 24. The letters 20 on the indicated keys may be circled as shown at 42 so that a permanent record of the choice is made.

The student then arranges the tones indicated on the keyboard according to their letter names in the measure spaces 34 in any order or time sequence that he wishes, for example in the illustrated embodiment.

Although it is preferable that the scale tone arrangements for left hand and right hand be such that the hands' must be decidedly independent from one another, it is also important that for beginners even time is used, so that although the hands are not synchronized, each note will be held for one count or a multiple thereof, and no split notes or one-and-a-half count notes are used. More advanced units utilizing more difficult timing could clearly be devised from the general concepts disclosed herein.

A student working with the invention will become increasingly able to use his left and right hands independently, and at the same time become familiar with rhythm patterns in all time signatures, all twelve key signatures, and incidentally the ease with which any chord type can be transposed into any desired key signature.

I claim:

1. An aid for teaching rhythm coordination comprising:
   a. a planar base member;
   b. a plurality of selectively exposeable panels secured to a lower portion of the forward face of said base member and having coincident straight upper edges;
   c. each of said panels having indicia naming a particular key signature, a display of at least a portion of a piano keyboard bordering the upper edge thereof, the keys of said keyboard belonging in said particular key signature being identified by their letter names;
   d. means of selecting individual keys of said keyboard representing the scale tones of a particular tone sequence;
   e. said panels each being provided with a circumscribed writing area beneath the keyboard display thereon, whereby a student can select a key signature by exposing an appropriate one of said panels, select a tone sequence within the selected key signature with said selecting means, and inscribe the scale tone names indicated on the respective keyboard display by said insert on said writing space.

2. Structure according to claim 1 wherein each of said panels is provided with a treble clef symbol and a bass clef symbol, indicia adjacent each clef symbol identifying the incidentals of the key signature named on the respective panel, and said writing area comprises two writing spaces, one adjacent the incidental indicia adjacent each clef symbol, whereby a student can inscribe the scale tone names of a chosen tone sequence in each of said two writing spaces and play the named tones simultaneously in the bars and treble octaves on a keyboard.

3. Structure according to claim 2 wherein said two writing spaces are laterally elongated, vertically spaced from one another and subdivided into equal numbers of individual measure spaces.

4. Structure according to claim 3 wherein said measure spaces of the upper and lower of said writing spaces are vertically aligned, and including a plurality of strips secured to said base member and individually extendable into operative position across said panels between the writing spaces of the exposed one of said panels, each of said strips having indicia thereon indicating a particular time signature and numbered meter signatures corresponding to said particular time signature which are vertically aligned with said measure spaces when the respective strip is extended into operative position.

5. Structure according to claim 4 wherein said panels are hinged to one side of the forward face of said base member, and said strips are pivoted to the other side of the forward face of said base member.

6. Structure according to claim 1 and including track means secured to said base member behind said panels and parallel to the upper edges thereof, and said means of selecting individual keys comprises at least one chord card resting in said track means and slideably adjustable therein, said card naming a particular chord type and having indicator means thereon spaced to register with selected keys of the exposed keyboard display constituting said particular chord type.

7. Structure according to claim 6 wherein said chord card has indicator means on both sides thereof such that the indicator means on each side is spaced to register with keys representing a chord type different from the other side.

* * * * *